UNITED STATES PATENT OFFICE.

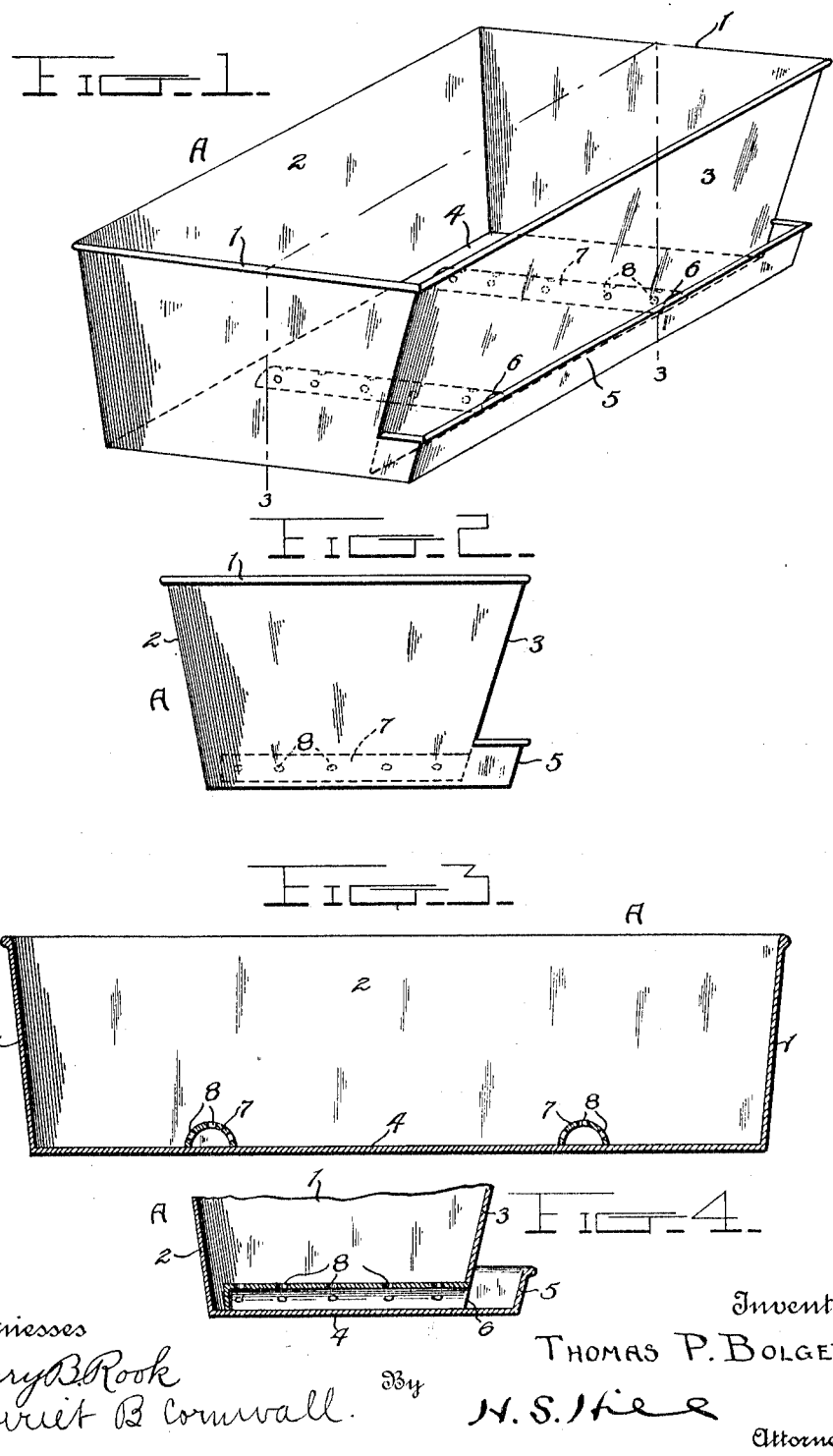

THOMAS P. BOLGER, OF GLOUCESTER, MASSACHUSETTS.

WINDOW-BOX FOR FLOWERS.

1,116,227.   Specification of Letters Patent.   Patented Nov. 3, 1914.

Application filed December 26, 1913. Serial No. 808,849.

*To all whom it may concern:*

Be it known that I, THOMAS P. BOLGER, a citizen of the United States, residing at Gloucester, in the county of Essex and State of Massachusetts, have invented certain new and useful Improvements in Window-Boxes for Flowers, of which the following is a specification.

The present invention relates to certain new and useful improvements in window boxes for flowers, and has for its object to provide a device of this character which embodies novel features of construction whereby the box may have a water tight bottom without interfering with proper drainage and ventilation, thereby enabling the box to be placed upon a window ledge, piazza rail, or the like, without danger of the water dripping or soaking through and injuring the part of the building upon which it rests.

A further object of the invention is to provide a window box for flowers which is formed in one piece and is simple and inexpensive in its construction, which can be readily moved from place to place, and which provides in an effective manner for drainage and ventilation so that there is no danger of the soil becoming soggy and interfering with the growth of flowers planted therein.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawing, in which:—

Figure 1 is a perspective view of a window box for flowers constructed in accordance with the invention. Fig. 2 is an end view of the same. Fig. 3 is a longitudinal sectional view on the line 3—3 of Fig. 1, and Fig. 4 is a transverse sectional view through the bottom of the flower box, the top of the box being removed.

Corresponding and like parts are referred to in the following description and indicated in all the views of the drawings by the same reference characters.

Specifically describing the present embodiment of the invention, the reference character A designates the flower box as an entirety, the said box being designed to be formed of some suitable material such as sheet metal, and being constructed in one piece. The box is open at the top and includes a pair of oppositely disposed ends 1, sides 2 and 3, and a bottom 4, the said bottom having a water tight connection with the lower edges of the sides and ends of the box and being without openings or perforations so that water within the box can not soak or drip through the bottom.

The sides 2 and 3 may be flared upwardly, and the bottom is extended beyond the side 3 where a shallow drainage and watering trough 5 is provided. This trough 5 is open at the top although it has water tight sides and bottom. The outer end of the drainage and watering trough 5 may, as shown by Fig. 2, be directly under the outer edge of the side 3, thereby providing a construction in which the side of the box overhangs the watering and drainage trough and serves to protect the same, as well as eliminate the necessity for an unbalanced and unsightly construction.

The lower edge of the side 3 is formed with a series of two or more openings 6 which communicate with transversely disposed drainage pipes or channels extending across the bottom 4 of the box. In the present instance these drainage pipes 7 are substantially semi-circular in cross section, being provided with numerous openings or perforations 8 through which water and air can circulate.

It will be obvious that with the above construction a window box for flowers having a water tight bottom is provided, and that this box can be placed upon a window ledge, piazza rail, or the like, without danger of the water soaking and dripping through so as to injure the part of the building upon which the box is supported. The box can be watered in the usual manner, and any surplus water accumulating at the bottom of the box will pass through the perforations 8 into the drainage tubes 7 and be carried thereby to the drainage and watering trough 5 at the side of the box. Air can also enter the soil through the drainage pipes 7 and perforations 8 so as to prevent the soil from becoming foul and soggy. Should it not be feasible to water the flowers from the top, water can be turned into the drainage and watering trough 5 and permitted to soak upwardly into the soil from the bottom of the box. The drainage is thus brought about through one side of the box in such a manner as to prevent dripping and to admit of the box being made with a water tight bottom without the usual objections to such a construction.

Having thus described the invention, what I claim as new and desire to secure by Letters Patent, is:—

1. The herein described window box for flowers including an elongated box formed with an open top and a closed bottom, said bottom being extended laterally beyond the junction thereof with one of the longer sides of the elongated box and the said longer side of the box being provided at intervals with notches in its lower edge, a shallow trough formed in conjunction with the before mentioned extended edge of the bottom and extending throughout the entire length of the box, and a series of horizontally disposed drainage pipes extending transversely across the bottom of the box and communicating with the shallow trough through the before mentioned notches in the lower edge of the side of the trough.

2. The herein described window box for flowers including an elongated box having an open top and a closed bottom, one of the longer sides of the box being inclined inwardly and downwardly toward the bottom and the bottom being extended laterally beyond its junction with said side, the lower edge of said side being formed at intervals with notches, a shallow trough formed in conjunction with the said laterally extended edge of the bottom, said trough extending the full length of the box and being completely overhung by the upper portion of the inclined side, and a series of horizontally disposed drainage pipes extending transversely across the bottom and communicating with the trough through the before mentioned notches in the lower edge of the inclined side of the box.

In testimony whereof I affix my signature in presence of two witnesses.

THOMAS P. BOLGER.

Witnesses:
CHARLES P. HENNESSEY,
M. FRANCIS BUCKLEY.